United States Patent
Kano et al.

(10) Patent No.: US 11,693,162 B2
(45) Date of Patent: Jul. 4, 2023

(54) OPTICAL TEST APPARATUS AND OPTICAL TEST METHOD

(71) Applicant: Kabushiki Kaisha Toshiba, Minato-ku (JP)

(72) Inventors: Hiroya Kano, Kawasaki (JP); Hiroshi Ohno, Tokyo (JP); Hideaki Okano, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 172 days.

(21) Appl. No.: 16/556,601

(22) Filed: Aug. 30, 2019

(65) Prior Publication Data
US 2020/0150326 A1    May 14, 2020

(30) Foreign Application Priority Data
Nov. 9, 2018    (JP) .................. 2018-211685

(51) Int. Cl.
*G02B 5/20* (2006.01)
*H04N 5/911* (2006.01)
*G01N 21/45* (2006.01)

(52) U.S. Cl.
CPC ............ *G02B 5/20* (2013.01); *H04N 5/911* (2013.01); *G01N 21/455* (2013.01)

(58) Field of Classification Search
CPC ........ G02B 5/20; G02B 27/288; G02B 5/201; H04N 5/911; H04N 5/772; G01N 21/455
USPC .................................. 359/580, 581, 588
See application file for complete search history.

(56) References Cited

U.S. PATENT DOCUMENTS

| | | | |
|---|---|---|---|
| 2015/0309225 A1* | 10/2015 | Moore | G02B 23/2446 |
| | | | 359/634 |
| 2019/0219501 A1 | 7/2019 | Ohno et al. | |
| 2019/0364267 A1 | 11/2019 | Ohno et al. | |

FOREIGN PATENT DOCUMENTS

| | | | | |
|---|---|---|---|---|
| JP | 58205834 A | * | 11/1983 | ........ G01M 11/0264 |
| JP | 2008-275453 A | | 11/2008 | |
| JP | 2015-536468 A | | 12/2015 | |
| JP | 2019-124542 | | 7/2019 | |
| JP | 2019-203796 A | | 11/2019 | |

OTHER PUBLICATIONS

Howes, W. "Rainbow schlieren and its applications", Applied Optics, vol. 23, Issue 14, 1984, pp. 2449-2460.

Kim, J. et al. "Multiaperture telecentric lens for 3D reconstruction", Optics Letters, vol. 36, No. 7, Apr. 1, 2011, pp. 1050-1052.

* cited by examiner

Primary Examiner — Jade R Chwasz
(74) Attorney, Agent, or Firm — Oblon, McClelland, Maier & Neustadt, L.L.P.

(57) ABSTRACT

An optical test apparatus includes a light convergence element, an optical filter, and an image sensor. The light convergence element converges light from a subject. The optical filter is arranged on an optical axis of the light convergence element. The image sensor is arranged in an effective region not crossing the optical axis of the light convergence element, and receives light passing through the light convergence element and the optical filter.

10 Claims, 10 Drawing Sheets

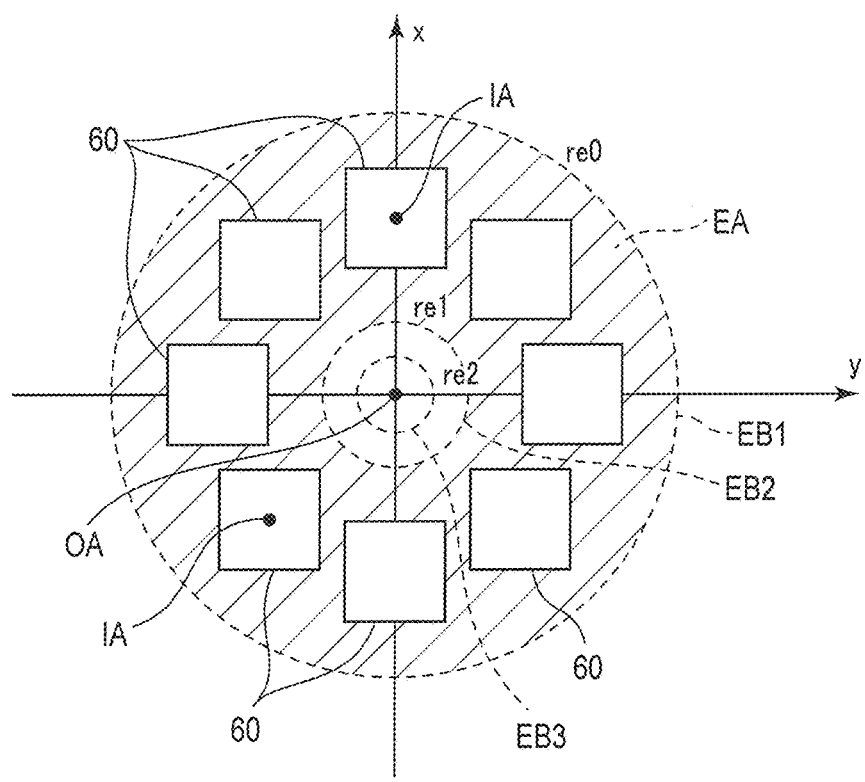
F I G. 13

OPTICAL TEST APPARATUS AND OPTICAL TEST METHOD

CROSS REFERENCE TO RELATED APPLICATION

This application is based upon and claims the benefit of priority from Japanese Patent Application No. 2018-211685, filed Nov. 9, 2018, the entire contents of which are incorporated herein by reference.

FIELD

Embodiments described herein relate generally to an optical test apparatus and an optical test method.

BACKGROUND

In various industries, contactless test techniques have become important.

BRIEF DESCRIPTION OF THE DRAWINGS

FIG. 13 is a schematic view of an x-y cross section for explaining an example of an arrangement of imaging planes in a case where the optical device of FIG. 1 has a plurality of image sensors.

DETAILED DESCRIPTION

Figure 1:
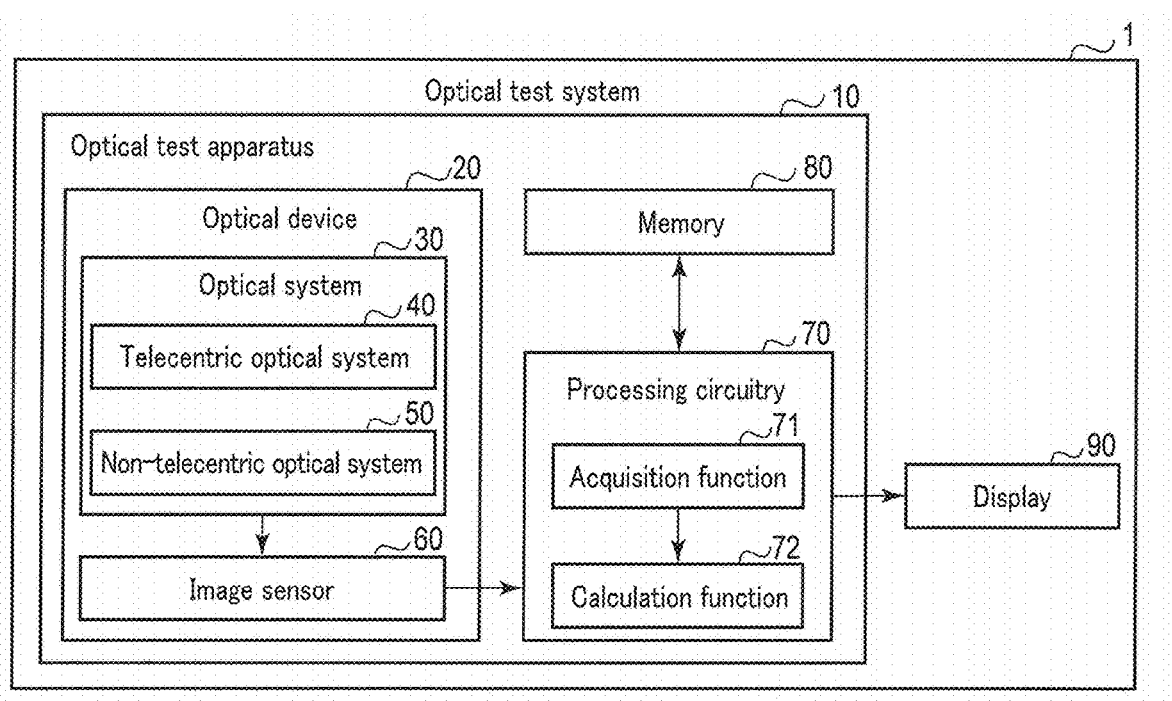
FIG. 1 is a block diagram showing an example of a configuration of an optical test system according to the embodiment.

According to one embodiment, an optical test apparatus includes a light convergence element, an optical filter, and an image sensor. The light convergence element converges light from a subject. The optical filter is arranged on an optical axis of the light convergence element. The image sensor is arranged in an effective region not crossing the optical axis of the light convergence element, and receives light passing through the light convergence element and the optical filter.

Various Embodiments will be described hereinafter with reference to the accompanying drawings. Each drawing is schematic or conceptual and the relationship between the thickness and the width of each part and the size ratio between the respective parts are not necessarily the same as actual ones. In addition, even when the same portions are shown, the portions are sometimes shown in different dimensions and ratios depending on the drawings. Note that in this specification and the respective drawings, the same reference numerals denote the same components described with reference to the drawings already referred to. A detailed description of such components will be omitted as appropriate.

Light or a light ray in a description of each embodiment is not limited to visible light or a visible light ray. However, the following description will exemplify a case in which white light is used as environment light. The light ray may also be a light beam.

First, the configuration of an optical test system 1 according to the present embodiment will be described in detail with reference to the drawings.

FIG. 1 is a block diagram showing an example of the configuration of the optical test system 1 according to the present embodiment. As shown in FIG. 1, the optical test system 1 includes an optical test apparatus 10 and a display 90. The optical test apparatus 10 includes an optical device 20, processing circuitry 70, and a memory 80.

Figure 2:
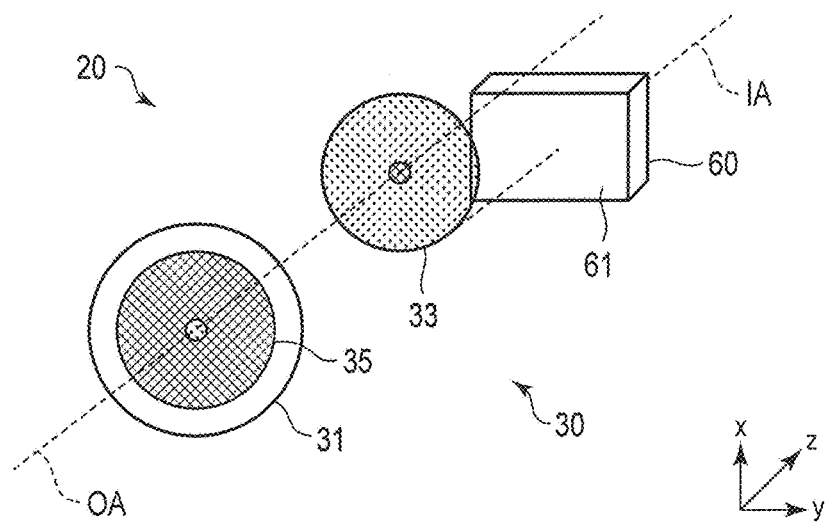
FIG. 2 is a bird's eye view schematically showing a configuration example of an optical device of FIG. 1.
Figure 3:
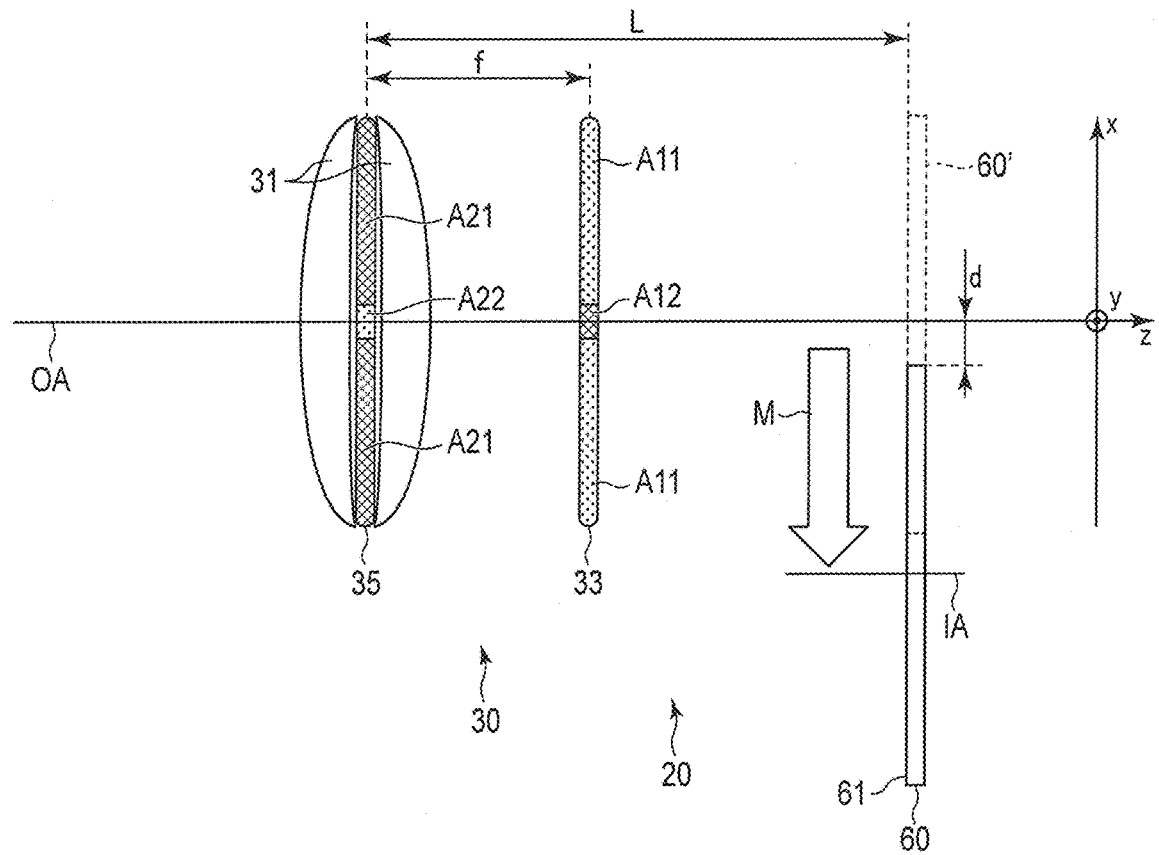
FIG. 3 is an x-z sectional view showing an example of the configuration of the optical device of FIG. 1.

FIG. 2 is a bird's eye view schematically showing a configuration example of the optical device 20 of FIG. 1. FIG. 3 is an x-z cross-sectional view showing an example of the configuration of the optical device 20 of FIG. 1. As shown in FIGS. 1, 2, and 3, the optical device 20 includes an optical system 30 and an image sensor 60. As shown in FIGS. 2 and 3, the optical system 30 includes a lens 31, a first optical filter 33, and a second optical filter 35.

In the present embodiment, each of x-axis, y-axis, and z-axis is defined as follows. The z-axis serves as the optical axis OA of the lens 31. The +z direction is a direction from the object-side focal point of the lens 31 to an image-side focal point of the lens 31. The x-axis and the y-axis are orthogonal to each other, and also orthogonal to the z-axis. The −x direction is, for example, the gravity direction. For example, in the example shown in FIG. 3, the +x direction, the +y direction, and +z direction are a direction from the lower side to the upper side, a direction from the back side to the front side that is perpendicular to the plane of this paper, and a direction from left to right, respectively.

The lens 31 converges a light ray emitted from an object point on a subject at an image point on an imaging plane 61 of the image sensor 60. The lens 31 includes a pair (set) of an object-side lens and an image-side lens. The object-side lens and the image-side lens have the same optical axis. The object-side lens and the image-side lens are symmetrical to each other with respect to a surface orthogonal to the optical axis. An image-side focal length of the lens 31 is a distance f. A distance between the image-side principal point of the lens 31 and the imaging plane 61 is a distance L. The lens 31 is made of, for example, optical glass; however, the configuration is not limited thereto. The lens 31 may be made of, for example, optical plastic such as an acrylic resin (polymethyl methacrylate: PMMA) or polycarbonate (PC). The lens 31 is an example of a light convergence element.

FIG. 3 shows a case where the lens 31 is a pair of lenses; however, the configuration is not limited thereto. The lens 31 may be one lens (single lens) or a lens obtained by combining a plurality of single lenses (compound lens). The compound lens may be a bonded type or a separate type.

The first optical filter 33 and the second optical filter 35 restrict a solid angle, of which a zenith direction is +z-axis direction, relative to light rays passing through the lens 31. The first optical filter 33 is arranged at the image-side focal point of the lens 31, as shown in FIG. 3. In other words, the first optical filter 33 is arranged away from the image-side principal point of the lens 31 toward the +z side by the distance f. The second optical filter 35 is arranged between the object-side lens and the image-side lens of the lens 31, as shown in FIG. 3. In this configuration, the center of the second optical filter 35 and the center of the lens 31 can be made to coincide with each other in the z-axis direction.

Figure 4A:
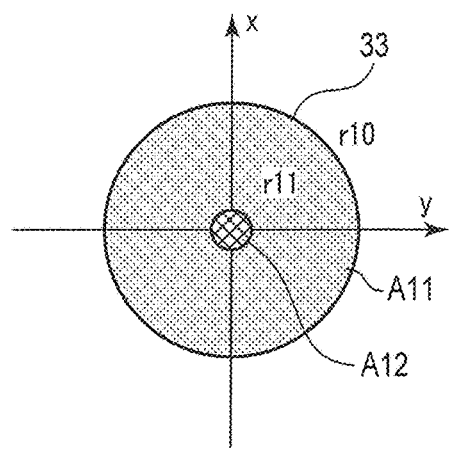
FIG. 4A is a schematic view showing an example of an x-y cross section of an aperture of a first optical filter of FIGS. 2 and 3.
Figure 4B:
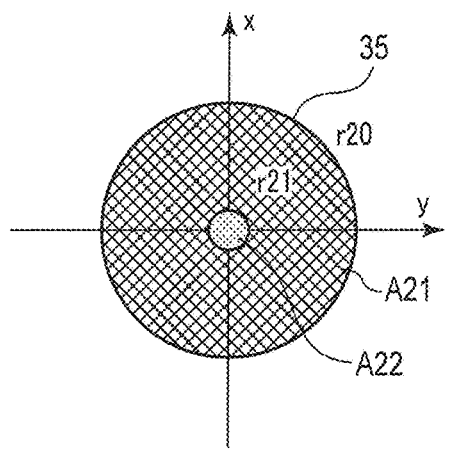
FIG. 4B is a schematic view showing an example of an x-y cross section of an aperture of a second optical filter of FIGS. 2 and 3.

Herein, the configurations of the first optical filter 33 and the second optical filter 35 will be described in detail with reference to the drawings. FIG. 4A is a schematic view showing an example of an x-y cross section of an aperture of the first optical filter 33 of FIGS. 2 and 3. FIG. 4B is a schematic view showing an example of an x-y cross section of an aperture of the second optical filter 35 of FIGS. 2 and 3.

Each of the first optical filter 33 and the second optical filter 35 includes a support member (not shown) and a wavelength selecting member. The support member has an aperture. The wavelength selecting member is provided in the aperture of the support member. Each of the outer shapes of the apertures and the wavelength selecting members of the first optical filter 33 and the second optical filter 35 is round, for example. The centers of the apertures and the wavelength selecting members of the first optical filter 33 and the second optical filter 35 are located on the z-axis (optical axis OA). The aperture and the wavelength selecting member of the first optical filter 33 are located on the image-side focal plane of the lens 31. On the other hand, the aperture and the wavelength selecting member of the second optical filter 35 are located on the image-side principal point plane of the lens 31. Each wavelength selecting member has a property of transmitting a light ray of a specific wavelength spectrum. Transmission may be expressed as passing. Each wavelength selecting member is, for example, a color filter.

Each of the wavelength selecting members of the first optical filter 33 and the second optical filter 35 includes a plurality of wavelength selecting regions. The present embodiment describes, as an example, a case in which a plurality of wavelength selecting regions are provided, for example, coaxially and concentrically, as shown in FIGS. 4A and 4B. Each of the plurality of wavelength selecting regions is provided with a blue color transmitting filter that transmits a blue light ray and a red color transmitting filter that transmits a red light ray. The regions provided with the blue color transmitting filter and the red color transmitting filter are the dot-hatched and grid-hatched regions, respectively, in FIGS. 3, 4A, and 4B. In this case, the peak wavelength of a wavelength spectrum of a blue light ray is 450 nm, for example. The peak wavelength of a wavelength spectrum of a red light ray is 650 nm, for example.

Specifically, the wavelength selecting member of the first optical filter 33 is divided into a peripheral region A11 (first peripheral region) of the focal plane and a central region Alt (first central region) of the focal plane, as shown in FIG. 4A. The peripheral region A11 of the focal plane and the central region A12 of the focal plane are a region from a circle having a radius r11 to a circle having a radius r10 and a region having a radius less than r11, respectively. The central region A12 of the focal plane is located on the optical axis OA of the lens 31. The peripheral region A11 of the focal plane and the central region A12 of the focal plane are respectively provided with a blue color transmitting filter and a red color transmitting filter. The radius r11 is an example of a first distance.

The wavelength selecting member of the second optical filter 35 is divided into a peripheral region A21 (second peripheral region) on the lens side and a central region A22 (second central region) on the lens side, as shown in FIG. 4B. The peripheral region A21 on the lens side and the central region A22 on the lens side are a region from a circle having a radius r21 to a circle having a radius r20 and a region having a radius less than r21, respectively. The central region A22 on the lens side is located on the optical axis OA of the lens 31. The peripheral region A21 on the lens side and the central region A22 on the lens side are respectively provided with a red color transmitting filter and a blue color transmitting filter. The radius r21 is an example of a second distance.

In this manner, the blue color transmitting filter and the red color transmitting filter are integrally formed in each of the first optical filter 33 and the second optical filter 35 according to the present embodiment. The blue color transmitting filter and the red color transmitting filter are respectively arranged rotation-symmetrically with respect to the optical axis OA of the lens 31.

Each of the wavelength selecting members of the first optical filter 33 and the second optical filter 35 may further include a transparent member that transmits a light ray of any wavelength in the visible light range and a black member that does not transmit a light ray of any wavelength in the visible light range. The transparent member may be expressed as a member that transmits white light (visible light).

For the apertures and the wavelength selecting members of the first optical filter 33 and the second optical filter 35, the outer shapes and the shapes of the wavelength selecting regions are not limited to a round shape and a concentric shape, but may be in some other shape. They may be in an unsymmetrical shape with respect to the optical axis OA. In other words, the second distance is not necessarily constant around the optical axis OA.

If the lens 31 is not a pair of lenses, for example, if the lens 31 is one lens, the second optical filter 35 has only to be arranged adjacently to the lens 31. In this case, the second optical filter 35 may be arranged on the +z side or the −z side of the lens 31.

The image sensor 60 is configured to output a light reception intensity of each pixel for a light ray entering the imaging plane 61. In other words, the image sensor 60 is configured to output a light reception position and a light reception intensity of the light ray entering the imaging plane 61. The image sensor 60 is a charge-coupled device (CCD), for example. The image sensor 60 is a single-plate type color CCD, for example, but may be a three-plate type color CCD. The image sensor 60 is not limited to the CCD, and may be an image sensor such as a complementary metal-oxide semiconductor (CMOS) or another kind of light receiving element. The image sensor 60 is arranged on the +z side with respect to the image-side focal point of the lens 31. The imaging plane 61 of the image sensor 60 is arranged away from the image-side principal point of the lens 31 toward the z-axis direction by a distance L. The imaging plane 61 is located on the light convergence plane of the lens 31. The imaging axis IA of the image sensor 60 is located off of the optical axis OA of the lens 31 as indicated by an arrow M in FIG. 3. The imaging axis of the image sensor 60 is parallel to the optical axis OA (the z-axis) of the lens 31. The image sensor 60 is arranged in a manner that the imaging plane 61 is located in an effective region EA. In the example shown in FIG. 3, the imaging plane 61 of the image sensor 60 is located away from the optical axis OA by a separation distance d.

Figure 5A:
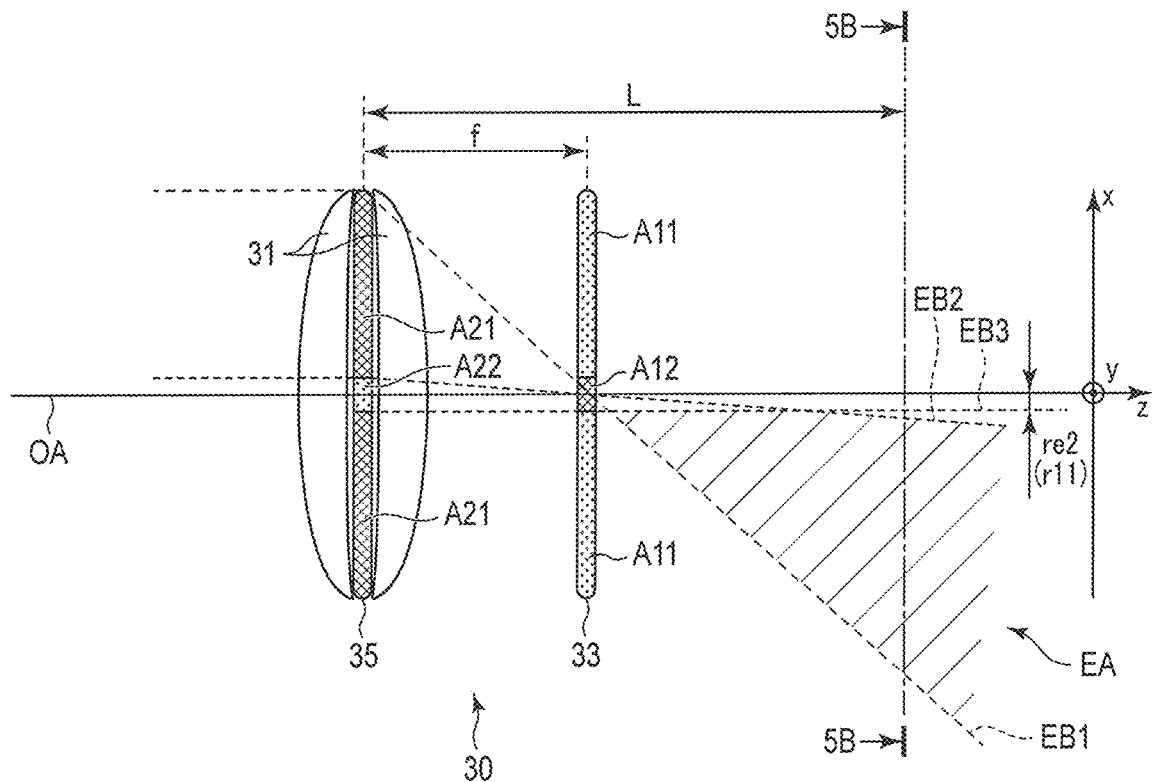
FIG. 5A is a schematic view of an x-z cross section for explaining an effective region for the optical device of FIG. 1.
Figure 5B:
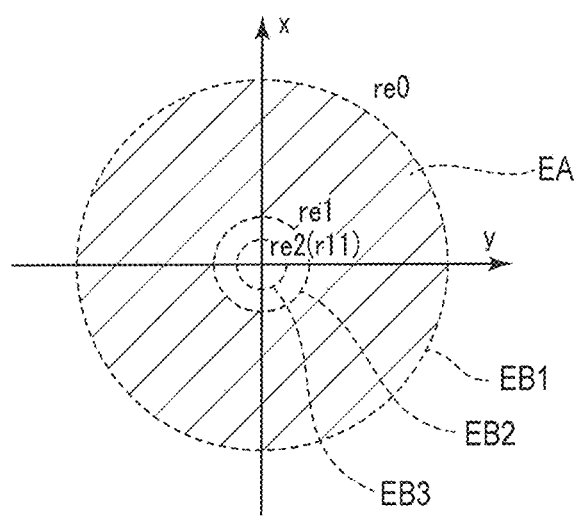
FIG. 5B is a schematic view of an x-y cross section for explaining the effective region for the optical device of FIG. 1.

The effective region EA according to the present embodiment will be described below with reference to the drawings. FIG. 5A is a schematic view of an x-z cross section for explaining the effective region EA for the optical device 20 of FIG. 1. FIG. 5B is a schematic view of an x-y cross section for explaining the effective region EA for the optical device 20 of FIG. 1. In FIGS. 5A and 5B, the effective region EA is the hatched region. For viewability, only a part of the effective region EA is shown in FIG. 5A.

The effective region EA does not cross the optical axis OA. In the effective region EA, preferably, it is possible to image both of a light ray passing through the telecentric optical system 40 and a light ray passing through the non-telecentric optical system 50 of light rays emitted from the same object point O.

As shown in FIGS. 5A and 5B, for example, the effective region EA is a region that opens in a direction (the +z direction) from the second optical filter 35 toward the first optical filter 33 in a region surrounded by a first curved surface EB1, a second curved surface EB2, and a third curved surface EB3. Herein, the first curved surface EB1 is a curved surface that passes through the center of the first optical filter 33 and the edge portion (outer periphery) of the peripheral region A21 on the lens side of the second optical filter 35. The second curved surface EB2 is a curved surface that passes through the center of the first optical filter 33 and the edge portion of the central region A22 on the lens side. The third curved surface EB3 is a curved surface that passes through the edge portion of the central region A12 of the focal plane and the edge portion of the central region A22 on the lens side.

As in the optical system 30 according to the present embodiment, if the size of the central region A22 on the lens side is similar to the size of the central region A12 of the focal plane by which telecentricity can be guaranteed, the second curved surface EB2 and the third curved surface EB3 may be considered as approximately the same curved surface. In such a case, the effective region EA may be expressed as a region that opens in a direction (the +z direction) from the second optical filter 35 toward the first optical filter 33 in a region surrounded by the first curved surface EB1 and the third curved surface EB3, for example. Accordingly, the imaging plane 61 has only to be provided at a position away from the optical axis OA by a distance equal to or more than the radius r11 of the central region A12 of the focal plane of the first optical filter 33.

The second curved surface EB2 may also be defined as a curved surface passing through a first point on the edge of the central region A12 of the focal plane and a second point on the edge of the central region A22 on the lens side, and the first and second points may be defined as symmetrical to each other with respect to the optical axis OA.

If the edge portion of the lens 31 is closer to the optical axis OA than the edge portion of the peripheral region A21 on the lens side, the first curved surface EB1 is a curved surface that passes through the center of the first optical filter 33 and the periphery of the lens 31.

Processing circuitry 70 is an integrated circuit such as a central processing unit (CPU) or an application specific integrated circuit (ASIC). A general purpose computer may be used as the processing circuitry 70. The processing circuitry 70 is not limited to being provided as a dedicated circuit, and may be provided as a program to be executed in a computer. In this case, the program is recorded in a memory area in the integrated circuit, the memory 80, etc. The processing circuitry 70 is coupled to the image sensor 60 and the memory 80. The processing circuitry 70 calculates information pertaining to the subject based on the output from the image sensor 60. The processing circuitry 70 implements an acquisition function 71 and a calculation function 72.

In the acquisition function 71, the processing circuitry 70 acquires the intensity for each of R, G, and B in a light beam entering each pixel of the imaging plane 61 based on the output from the image sensor 60. In other words, the processing circuitry 70 performs color separation for image data output from the image sensor 60, thereby generating image data for respective colors.

In the calculation function 72, the processing circuitry 70 calculates information pertaining to the subject based on the image data for respective colors. Specifically, the processing circuitry 70 specifies, from image data of a plurality of colors, an image (imaging position) of a given object point on the subject produced by the light ray emitted from the object point. The processing circuitry 70 calculates the three-dimensional position of the object point on the subject based on the specified imaging position. The three-dimensional position of the object point on the subject is an example of the information pertaining to the subject. Thus, it may also be expressed that the information pertaining to the subject includes a three-dimensional shape of the subject.

The processing circuitry 70 may exist outside the optical test apparatus 10. In this case, the output from the image sensor 60 may be output outside the optical test apparatus 10 or recorded in the memory 80. In other words, the information pertaining to the subject may be calculated inside or outside the optical test apparatus 10.

The memory 80 stores the output from the image sensor 60 or the processing circuitry 70. The memory 80 stores the focal length f of the lens 31, the distance L between the lens 31 and the imaging plane 61 in the z direction, the position of the imaging plane 61 with respect to the optical axis OA of the lens 31, the arrangement of the wavelength selecting region of the first optical filter 33, and the arrangement of the wavelength selecting region of the second optical filter 35. The memory 80 is a nonvolatile memory such as a flash memory, for example; however, the memory 80 may be a storage device such as a hard disk drive (HDD), a solid state drive (SSD), or an integral circuit storage device, and may further include a volatile memory.

The display 90 displays the output from the processing circuitry 70. The output from the processing circuitry 70 includes, for example, an image and an operation screen based on the image data output from the image sensor 60. The display 90 is a liquid crystal display or an organic EL display, for example. The display 90 is not necessarily provided. In this case, the output from the processing circuitry 70 may be recorded in the memory 80, displayed on a display provided outside the optical test system 1, or recorded in a memory provided outside the optical test system 1.

Next, the operation of the optical test system 1 according to the present embodiment will be described in detail with reference to the drawings. In the optical test system 1, measurement processing and calculation processing are performed.

[Measurement Processing]

Figure 6:
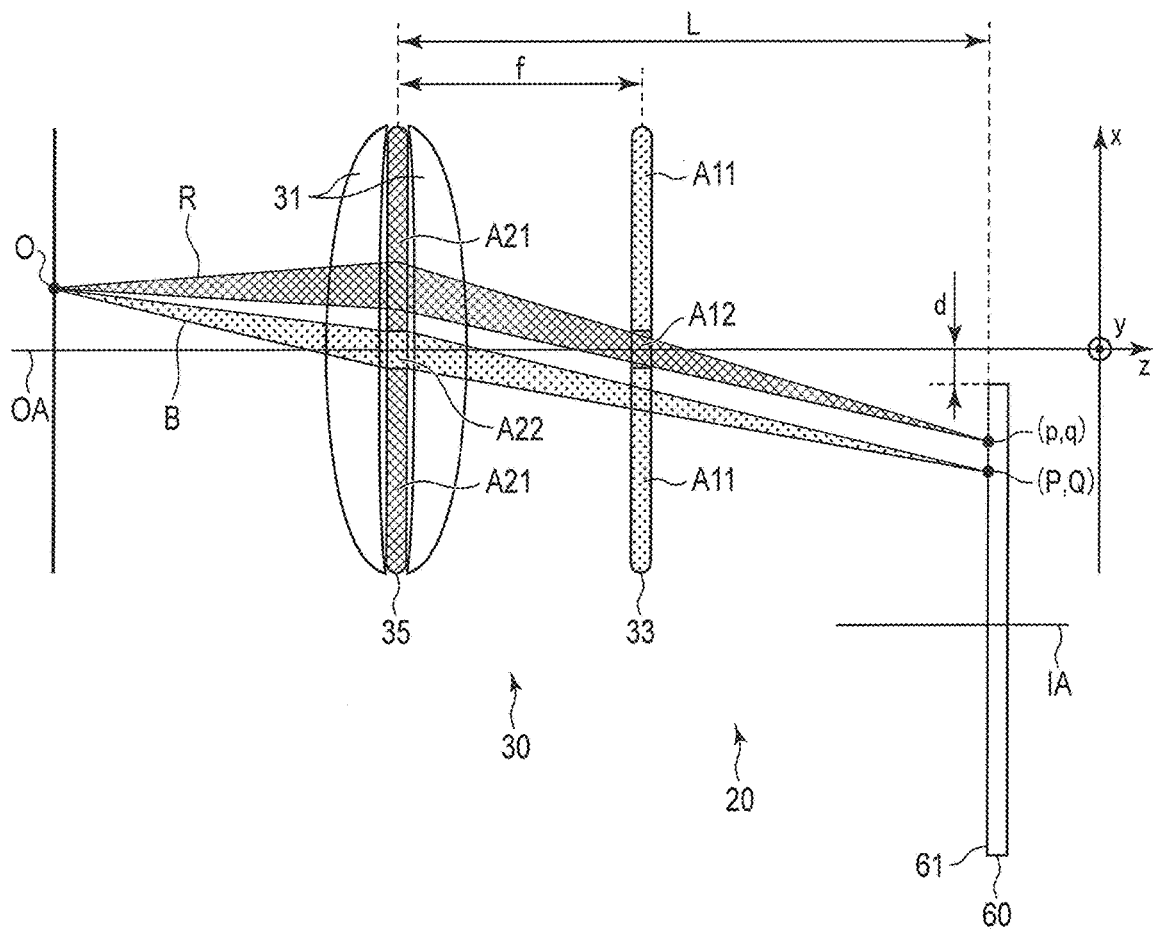
FIG. 6 is a schematic view for explaining an example of a ray path in the optical device of FIG. 1.

FIG. 6 is a schematic view for explaining an example of a ray path in the optical device 20 of FIG. 1. As shown in FIG. 6, light rays including light rays B and R are emitted from a given object point O on the subject surface. These light rays are light rays of environment light or the like reflected or scattered at the object point O. Assume that the environment light is white light. As shown in FIG. 6, among the light rays emitted from the given object point O, light rays passing through the first optical filter 33 and the second optical filter 35 enter the imaging plane 61 of the image sensor 60 by the lens 31. In the measurement processing, the image sensor 60 performs imaging for the light rays entering the imaging plane 61.

First, consider light rays that have a principal ray parallel to the optical axis OA of the lens 31 when the light rays enter the lens 31. Among these light rays, a light ray R passing through the peripheral region A21 on the lens side of the second optical filter 35 is a red light ray. In addition, a light ray B passing through the central region A22 on the lens side is a blue light ray. These light rays enter the central region A12 of the focal plane of the first optical filter 33 arranged at the image-side focal point of the lens 31. The blue light ray B among the light lays entering the central region A12 of the focal plane does not have a red wavelength component; thus, the blue light ray B cannot be transmitted through the central region A12 of the focal plane. On the other hand, the red light ray R can be transmitted through the central region A12 of the focal plane.

Accordingly, the optical system 30 is a telecentric optical system 40 that has telecentricity on the object side for the red light ray R. In other words, the telecentric optical system 40 is an object-side (subject side) telecentric optical system that passes a red light ray. In the object-side telecentric optical system, an entrance pupil is located at an infinite position, and the optical axis OA and a principal ray are parallel to each other in an object space. Herein, the telecentric optical system 40 includes the lens 31, the first optical filter 33, and the second optical filter 35. The telecentric optical system 40 is an example of the first optical system.

Next, consider light rays that have a principal ray not parallel to the optical axis OA of the lens 31 when the light rays enter the lens 31. These light rays do not enter the central region A12 of the focal plane. In other words, these light rays enter the peripheral region A11 of the focal plane, or are directed to a region outside the peripheral region A11 of the focal plane. The light rays directed to a region outside the peripheral region A11 of the focal plane are not imaged in the optical device 20 according to the present embodiment. The red light ray R among the light rays entering the peripheral region A11 of the focal plane does not have a blue wavelength component; thus, the light ray R cannot be transmitted through the central region A11 of the focal plane. On the other hand, the blue light ray B can be transmitted through the peripheral region A11 of the focal plane.

Accordingly, the optical system 30 may be expressed as a non-telecentric optical system 50 having no telecentricity on the object side relative to the blue light ray B. In other words, the non-telecentric optical system 50 is a normal lens optical system that passes a blue light ray. The normal lens optical system includes an optical system that does not have telecentricity such as an entocentric optical system, a magnification optical system, or a reduction optical system. The non-telecentric optical system 50 includes the lens 31, the first optical filter 33, and the second optical filter 35. The non-telecentric optical system 50 is an example of the second optical system.

As described above, the optical system 30 according to the present embodiment includes a telecentric optical system 40 and a non-telecentric optical system 50. The optical axis of the telecentric optical system 40 coincides with the optical axis of the non-telecentric optical system 50. Furthermore, the telecentric optical system 40 shares at least one lens with the non-telecentric optical system 50. The shared lens is the lens 31, for example.

The red light ray R transmitted through the central region A12 of the focal plane and the blue light ray B transmitted through the peripheral region A11 of the focal plane enter the imaging plane 61. As described above, in the measurement processing, the image sensor 60 simultaneously receives the red light ray R passing through the optical system 30 as the telecentric optical system and the blue light ray B passing through the optical system 30 as the non-telecentric optical system among the light rays emitted from a given object point O. The image sensor 60 converts the light ray R and the light ray B into electric signals and A/D-converts the electric signals, thereby generating image data for the subject. The image sensor 60 outputs the image data to the processing circuitry 70. The image data indicates the space distribution of the subject. The image data illustrates an image produced by the light ray R and an image produced by the light ray B for each object point on the subject. Herein, the position of the image produced by the light ray R passing through the telecentric optical system 40 does not change in accordance with the distance from the object point to the image sensor 60. On the other hand, the position of the image produced by the light ray B passing through the non-telecentric optical system 50 changes in accordance with the distance from the object point to the image sensor 60. Accordingly, a distance between an image produced by the light ray R and an image produced by the light ray B relative to the same object point changes in accordance with the distance from the object point to the image sensor 60. A distance from the image sensor 60 to the object point or to the subject is obtained by measuring or observing the distance between an image produced by the light ray R and an image produced by the light ray B in the image data. The image produced by the light ray R and the image produced by the light ray B are examples of a first image and a second image, respectively.

[Calculation Processing]

Figure 7:
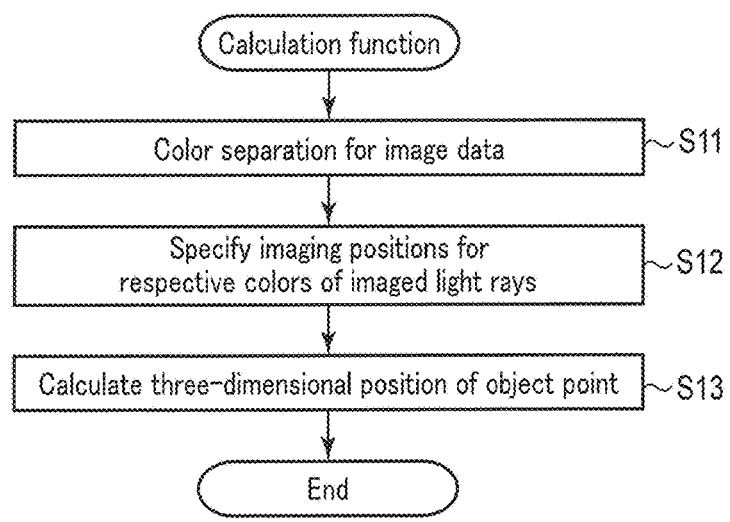
FIG. 7 is a flowchart showing an example of calculation processing performed by the optical test apparatus of FIG. 1.

FIG. 7 is a flowchart showing an example of the calculation processing performed by the optical test apparatus 10 of FIG. 1. In the calculation processing, the processing circuitry 70 calculates the three-dimensional shape of the subject based on the output from the image sensor 60.

The processing shown in FIG. 7 is started after acquiring the image data obtained by imaging in the measurement processing.

In step S11, the processing circuitry 70 performs color extraction processing. In the color extraction processing, the processing circuitry 70 performs color separation for the acquired data, thereby extracting image data for respective colors. Although the image data is described, the data is not limited to data that can be displayed as an image, and it is only necessary to extract a light ray intensity for each pixel of each color of the image sensor 60.

In step S12, the processing circuitry 70 performs the image plane position acquisition processing. The processing circuitry 70 specifies the imaging positions for respective colors based on the image data for respective colors. The imaging positions can be expressed as the incident positions of the light rays on the imaging plane 61. The processing circuitry 70, for example, performs image processing such as edge enhancement for the image data, and specifies an imaging position corresponding to the object point O. At this time, image processing such as pixel matching may be performed for the shape of the detected edge, for example.

A point light source may be used as the object point O. In this case, for example, a position with high luminance in the image data may be specified as an imaging position. A transmissive dot pattern, for example, may be used as the object point O. In this case, for example, the above-described image processing such as edge detection or pixel matching may be performed.

In step S13, the processing circuitry 70 performs the object point position calculation processing. In the object point position calculation processing, the processing circuitry 70 calculates the three-dimensional position of the object point O of the subject based on the imaging positions of the light rays for the respective colors on the imaging plane 61.

The object point position calculation processing will be described in detail below.

(x, y, z) represent coordinates indicating the position of the object point O in three-dimensional space. As shown in FIG. 6, (p, q) represent coordinates indicating the incident position of the red light ray R on the imaging plane 61, the red light ray R emitted from the object point O and passing through the optical system 30 as a telecentric optical system. In addition, (P, Q) represent coordinates indicating the incident position of the blue light ray B on the imaging plane 61, the blue light ray B emitted from the object point O and passing through the optical system 30 as a non-telecentric optical system. Herein, the origin of the coordinates indicating the incident positions of the light rays on the imaging plane 61 is on the optical axis OA. The processing circuitry 70 acquires, from the memory 80, for example, the position of the imaging plane 61 with respect to the optical axis OA of the lens 31. The processing circuitry 70 acquires, from the image sensor 60, an incident position of each light ray in the coordinate system on the imaging plane 61. The processing circuitry 70 calculates coordinates indicating an incident position of each light ray on the imaging plane 61 by using the position of the imaging plane 61 with respect to the optical axis OA of the lens 31 and an incident position of each light ray in the coordinate system on the imaging plane 61.

At this time, by geometric optics, the imaging position of the blue light ray B passing through the optical system 30 as a non-telecentric optical system is expressed by the following equation:

$$\begin{bmatrix} P \\ Q \end{bmatrix} = \left(\frac{L}{z}\right)\begin{bmatrix} x \\ y \end{bmatrix} \pm \left(\frac{L}{f}\left(1 - \frac{f}{z}\right) - 1\right)\begin{bmatrix} r_0 \\ r_0 \end{bmatrix}. \quad \text{Eq. (1)}$$

The second term on the right side of Equation (1) represents a marginal ray passing through the end portion of the central region A22 on the lens side of the second optical filter 35.

On the other hand, by geometric optics, the imaging position of the red light ray R passing through the optical system 30 as a telecentric optical system is expressed by the following equation:

$$\begin{bmatrix} p \\ q \end{bmatrix} = \left(\frac{L}{f} - 1\right)\begin{bmatrix} x \\ y \end{bmatrix} \pm \left(\frac{L}{f} - \frac{1}{f}\left(\frac{L}{f} - 1\right)z\right)\begin{bmatrix} r_1 \\ r_1 \end{bmatrix}. \quad \text{Eq. (2)}$$

The second term on the right side of Equation (2) represents a marginal ray passing through the end portion of the central region A12 of the focal plane of the first optical filter 33.

Based on Equations (1) and (2), the position of the object point O in the three-dimensional space is expressed by the following equation by using the imaging position of each light ray:

$$\begin{bmatrix} x \\ y \\ z \end{bmatrix} = \begin{bmatrix} \frac{f}{L-f}p \\ \frac{f}{L-f}q \\ \frac{Lf\sqrt{p^2+q^2}}{L-f\sqrt{P^2+Q^2}} \end{bmatrix}. \quad \text{Eq. (3)}$$

The processing circuitry 70 calculates the three-dimensional position of the object point O based on the imaging data using equation (3). In the image plane position acquisition processing, the plurality of imaging positions corresponding to a plurality of object points O on the subject are acquired for each color; thus, a three-dimensional shape of the subject can be calculated based on the imaging data. Information pertaining to the subject, such as the calculated three-dimensional shape of the subject, is displayed on the display 90.

As described above, the optical test system 1 according to the present embodiment can effectively use the region on the imaging plane, which leads to measurement of the three-dimensional position of the object point O with a high degree of accuracy. The three-dimensional position of the object point O is an example of the information pertaining to the subject. In other words, with the technique according to the present embodiment, the three-dimensional surface shape of the subject can be measured with a high degree of accuracy. The technique of contactless measurement of a distance to an object and a three-dimensional shape of an object may be applied to various uses. For example, there is a demand for a technique of measuring a distance to an object in the field related to a car-mounted camera and machine vision. For example, there is a demand for a technique of measuring a three-dimensional surface shape in the field related to product inspection in manufacturing and non-destructive inspection of infrastructure. Under such circumstances, according to the present technique, at minimum, one image sensor 60 suffices. Furthermore, according to the present technique, measurement can be performed by using the environmental light scattered on an object. Therefore, measurement can be performed without preparing two image sensors as in a stereo camera or preparing a light source (a projector) as in a structured illumination. In other words, according to the present technique, an effect of cost reduction and size reduction can be obtained.

In the optical test system 1 according to the present embodiment, the imaging plane 61 of the image sensor 60 is arranged in the effective region EA. The imaging axis IA of the image sensor 60 is arranged away from the optical axis OA of the optical system 30. Such configuration has the following effects.

Figure 8:
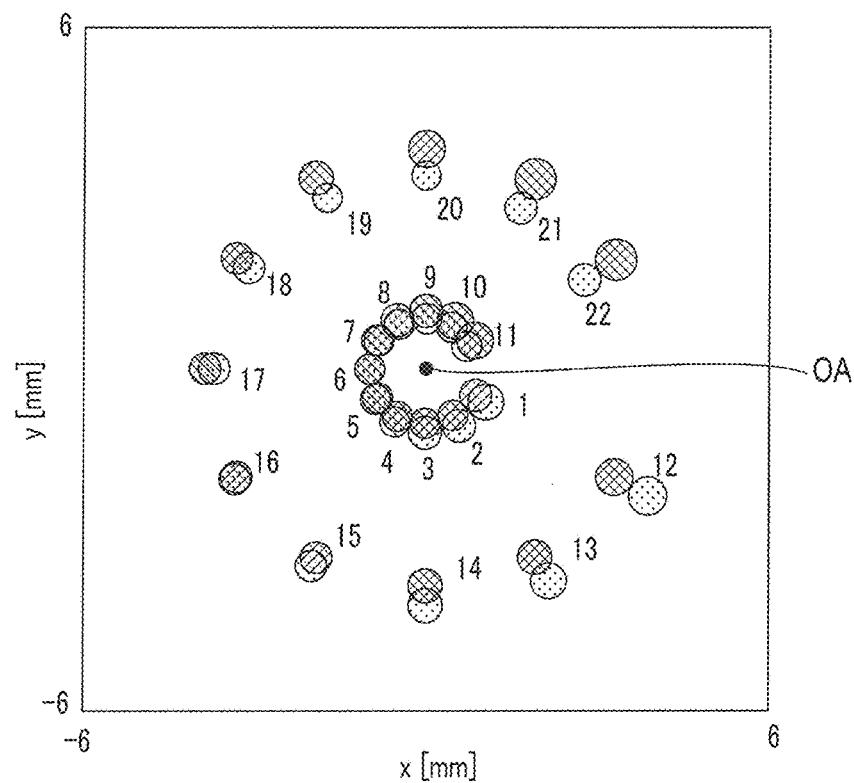
FIG. 8 is a diagram for explaining the relationship between a distance between an optical axis and an imaging axis in the optical device of FIG. 1, and detection sensitivity for a three-dimensional position of an object point.

FIG. 8 is a diagram for explaining the relationship between a distance between the optical axis OA and the imaging axis IA in the optical device 20 of FIG. 1, and detection sensitivity for a three-dimensional position of an object point O. FIG. 8 shows a numerical analysis result for the relationships between the optical axis OA located away from the lens 31 by the distance L and light ray positions in the optical device 20 of FIG. 1. FIG. 8 may be expressed as a numerical analysis result for light received by the image sensor 60' of FIG. 3. In FIG. 8, points 1 to 22 respectively indicate different object points O on the subject. The positions of points 1 to 11 in the z direction are the same as positions of the points 12 to 22 in the z direction, respectively. The object point O is located in the +z direction in the order of 1 to 11 or 12 to 22. In FIG. 8, the dot hatching and the grid hatching respectively indicate light ray positions of the blue light ray B and light ray positions of the red light ray R.

Generally, a lens is designed to produce the highest performance on the optical axis. Thus, if the imaging axis is brought away from the optical axis, measurement accuracy may decrease. On the other hand, as shown in FIG. 8, in the optical device 20 according to the present embodiment, the intervals between the imaging positions relative to the points 12 to 22 are larger than the intervals between the imaging positions relative to the points 1 to 11, respectively. In other words, according to the numerical analysis result shown in FIG. 8, the position gap between red and blue becomes larger at a position further away from the optical axis OA even if the subject is at the same distance. Herein, as described above, a three-dimensional position of an object point O is calculated based on difference between the imaging position of a blue light ray B and the imaging position of a red light ray R. Accordingly, in a region with a larger position gap between red and blue in FIG. 8, an image moves more sensitively in response to a fine movement of an object in the z direction. In other words, the further the imaging axis IA is away from the optical axis OA, the higher the detection sensitivity becomes. In the optical test system 1 according to the present embodiment, the imaging axis IA of the image sensor 60 is located away from the optical axis OA of the optical system 30, which enables imaging of a region far away from the optical axis. In other words, an effect of improving the distance detection sensitivity is obtained by the present technique.

Figure 9:
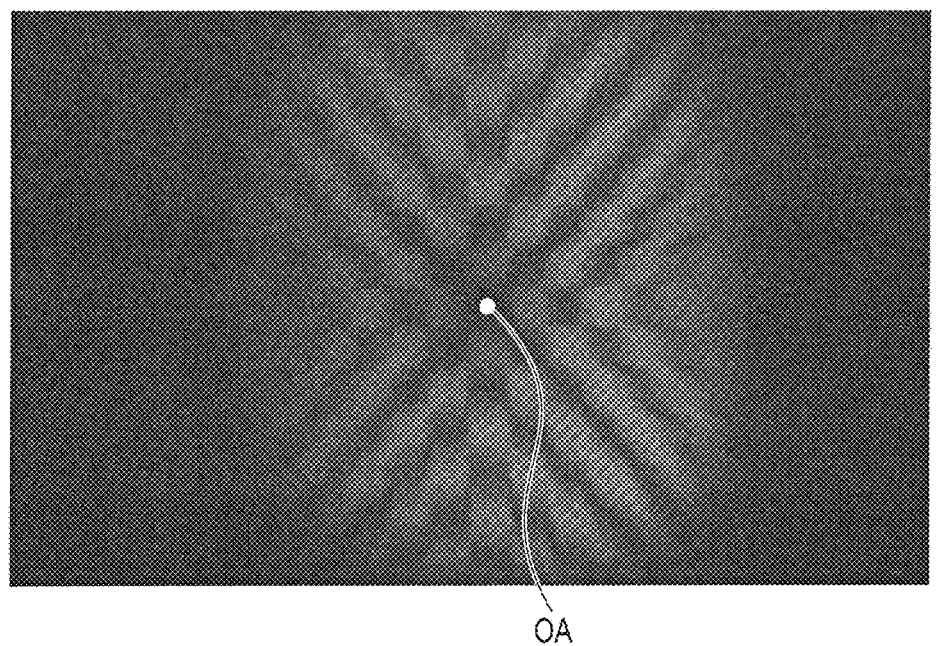
FIG. 9 is a diagram for explaining an unmeasurable region in the optical device of FIG. 1.

FIG. 9 is a diagram for explaining an unmeasurable region in the optical device 20 of FIG. 1. FIG. 9 shows a measurement result indicating the optical axis OA located away from the lens 31 by the distance L and a light ray position of the light ray R relative to light rays emitted from the subject having a checker pattern in the optical device 20 of FIG. 1. FIG. 9 may be expressed as a measurement result for light received by the image sensor 60' of FIG. 3. In FIG. 9, the grid hatching indicates a light ray position of the red light ray R. As explained with reference to FIG. 6, a red wavelength component of the light rays emitted from the subject cannot be transmitted through the central region A22 on the lens side. The red light ray R that can be transmitted through the peripheral region A21 on the lens side can be transmitted through the central region A12 of the focal plane (the image-side focal point of the lens 31), but cannot be transmitted through the peripheral region A11 of the focal plane. Accordingly, as shown in FIG. 9, the light ray R emitted from the object point O of the subject on the optical axis OA cannot be imaged on the optical axis OA. A light emitted from the object point O on the optical axis OA may reach the imaging plane 61 depending on, for example, performance and characteristics relating to wavelength selectivity of the optical filter. However, the object point O on the optical axis OA is represented by (p, q)=(P, Q)=(0, 0); thus, as understood from Equation (3), a three-dimensional position of the object point O on the optical axis OA cannot be calculated, regardless of performance and characteristics relating to wavelength selectivity of the optical filter. Under such circumstances, in the optical test system 1 according to the present embodiment, the imaging axis IA of the image sensor 60 is located away from the optical axis OA of the optical system 30, and the optical axis OA can be excluded from the imaging range of the image sensor 60. In other words, according to the present technique, a distance to the subject can be calculated by imaging the subject by using all the pixels of the image sensor 60. An increase in the number of pixels which can be used for imaging contributes to improvement in accuracy of detecting an imaging position on the imaging plane 61.

Figure 10:
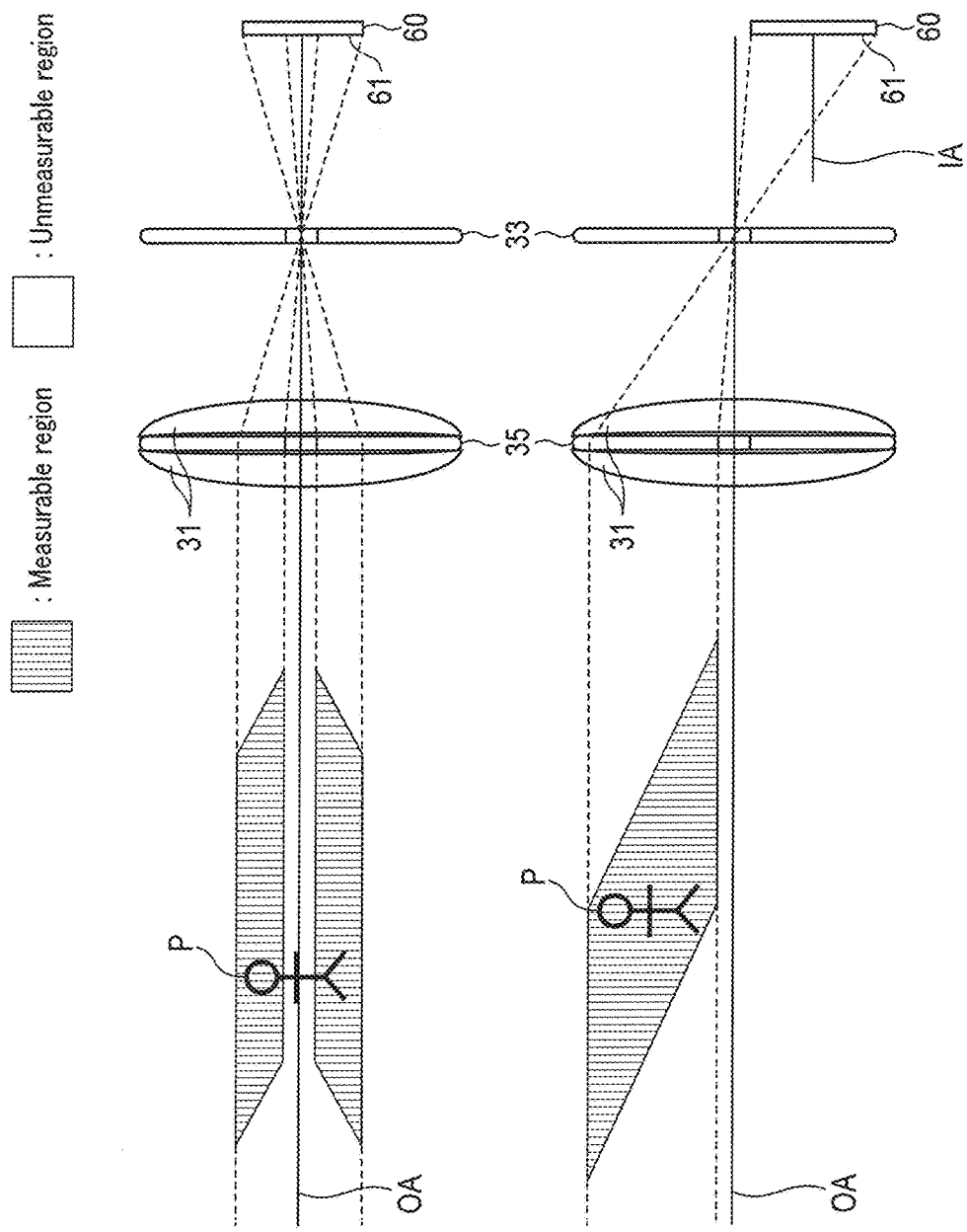
FIG. 10 is a diagram for explaining a measurable region in the optical device of FIG. 1.

FIG. 10 is a diagram for explaining a measurable region in the optical device 20 of FIG. 1. As shown in FIG. 10, distribution of the measurable region in a case where the imaging axis IA coincides with the optical axis OA is different from distribution of the measurable region in a case where the imaging axis IA is arranged away from the optical axis OA. Since the subject on the optical axis OA cannot be imaged as described above, the measurable region is cylindrical if the imaging axis IA is made to coincide with the optical axis OA. In other words, if a subject is at the position including the optical axis OA (for example, the photographic subject P of FIG. 10), the entire subject cannot be measured. On the other hand, if the imaging axis IA is arranged away from the optical axis OA, the measurable region can be columnar. In other words, the present technique has an effect that a measurable region focusing on the observed subject can be formed.

[First Modification]

An optical test system 1 according to the present modification will be described in detail below with reference to the drawings. Differences from the first embodiment will mainly be described. The same reference numerals denote the same parts, and a description thereof will be omitted.

The first embodiment describes, as an example, the case where the size of the central region A22 on the lens side is similar to the size of the central region A12 of the focal plane by which telecentricity can be guaranteed. However, the configuration is not limited thereto. The present technique can increase the size of the central region A22 on the lens side.

Figure 11:
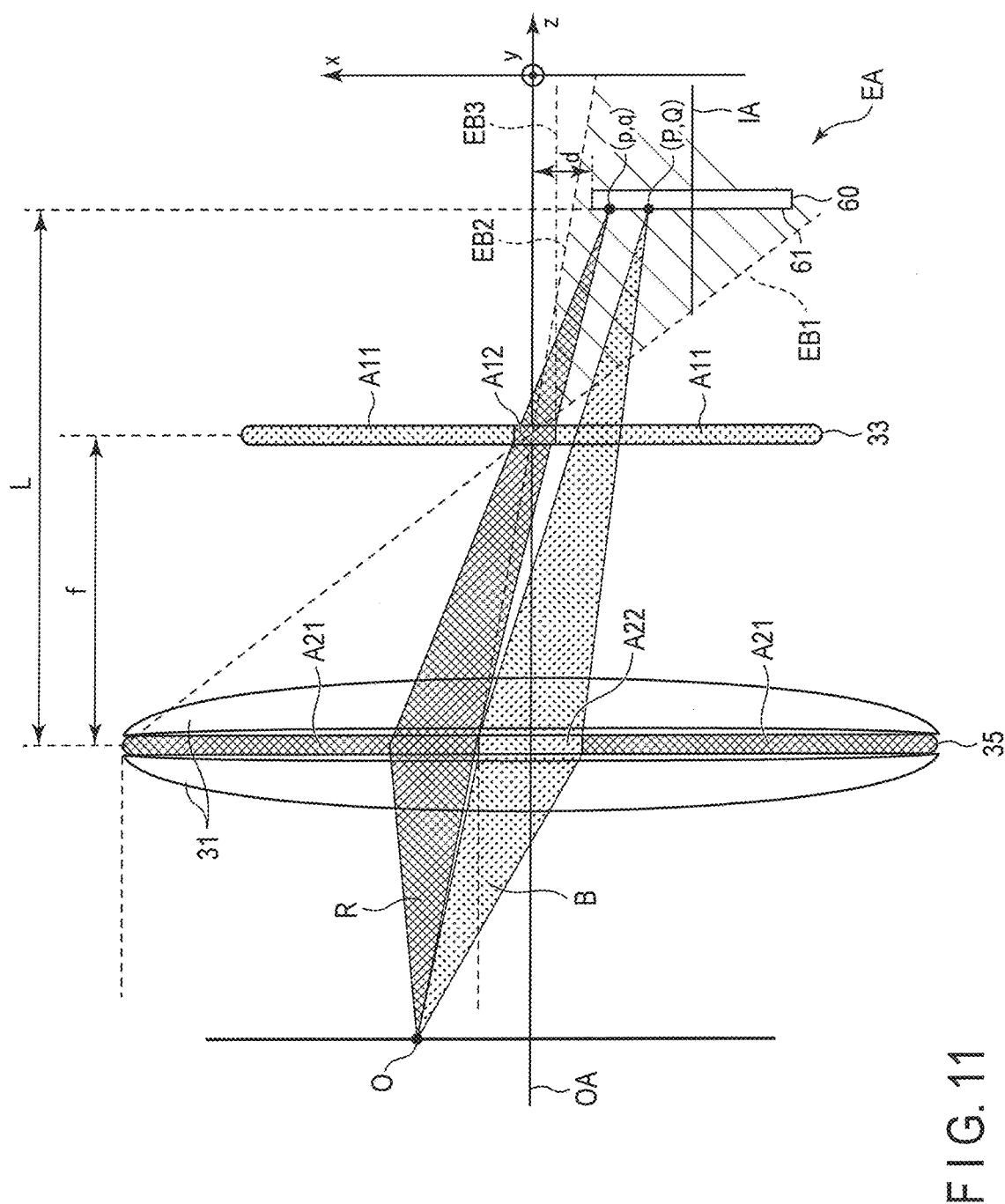
FIG. 11 is an x-z cross-sectional view showing an example of a configuration of an optical device according to a first modification.

FIG. 11 is an x-z cross-sectional view showing an example of the configuration of an optical device 20 according to the present modification. As described above with reference to FIGS. 5A, 5B, and 10, etc., by the present technique, instead of reducing the diameter of the central region A22 on the lens side of the second optical filter, a subject near the optical axis OA can be photographed by separating the imaging axis IA from the optical axis OA. In other words, as shown in FIG. 11, the central region A22 on the lens side may be made larger than the central region A12 of the focal plane by separating the imaging axis IA from the optical axis OA.

Expansion of the central region A22 on the lens side contributes to increase in light amount of a blue light ray B that can be transmitted through the central region A22 on the lens side. Thus, a brighter image can be obtained. In addition, image forming capability relative to a blue light ray B can be improved. Therefore, according to the configuration of the present modification, the measurement accuracy can be further improved.

[Second Modification]

An optical test system 1 according to the present modification will be described in detail below with reference to the drawings. Differences from the first embodiment will mainly be described. The same reference numerals denote the same parts, and a description thereof will be omitted.

The first embodiment describes, as an example, the optical system 30 having telecentricity and non-telecentricity in accordance with wavelength components of the light rays emitted from the object point O on the subject. However, the configuration is not limited thereto. Each of the first optical filter 33 and the second optical filter 35 has only to have a characteristic selecting region that selectively transmits light in accordance with characteristics of the light. For example, the present technique can realize an optical system 30 having telecentricity and non-telecentricity in accordance with polarization components of light rays emitted from the object point O on the subject.

Unlike in the first embodiment, the image sensor 60 according to the present modification is a polarization camera configured to image at least two polarized regions. The polarization camera is, for example, the image sensor 60 according to the first embodiment further including a polarization plate (a polarizer, a polarizing filter). The polarization plate is provided on the imaging plane 61. The image sensor 60 outputs, to the processing circuitry 70, image data including light ray positions of respective polarization components.

The processing circuitry 70 according to the present modification divides the image data according to the respective polarization components in step S11 in FIG. 7. After that, the processing circuitry 70 specifies imaging positions of respective polarization components (step S12), and calculates information pertaining to the subject based on the specified imaging positions (step S13).

Figure 12A:
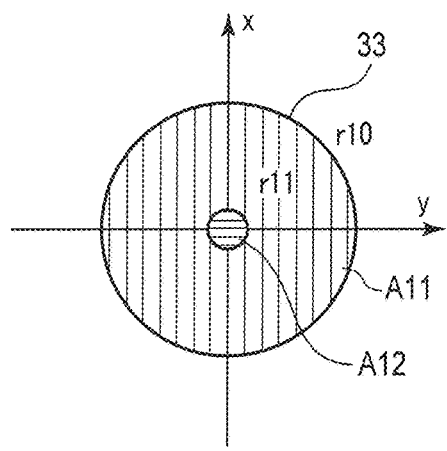
FIG. 12A is a schematic view showing an example of an x-y cross section of an aperture of a third optical filter according to a second modification.
Figure 12B:
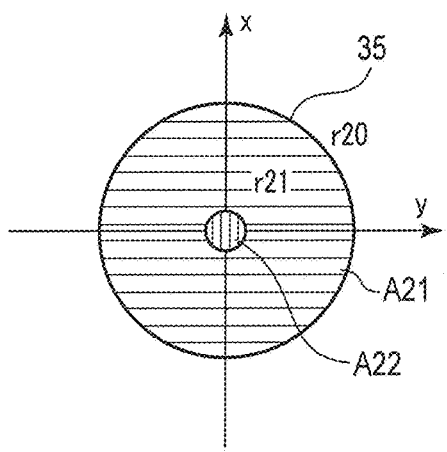
FIG. 12B is a schematic view showing an example of an x-y cross section of an aperture of a fourth optical filter according to the second modification.

FIG. 12A is a schematic view showing an example of an x-y cross section of an aperture of the first optical filter 33 according to the present modification. FIG. 12B is a schematic view showing an example of an x-y cross section of an aperture of the second optical filter 35 according to the present modification. As shown in FIGS. 12A and 12B, the peripheral region A11 of the focal plane of the first optical filter 33 and the central region A22 on the lens side of the second optical filter 35 according to the present modification transmit light rays having the same polarization direction. The central region A12 of the focal plane and the peripheral region A21 on the lens side transmit light rays having the same polarization direction. Meanwhile, the central region A12 of the focal plane and the peripheral region A21 on the lens side transmit light rays having a different polarization direction from the peripheral region A11 of the focal plane and the central region A22 on the lens side. The region that selectively transmits light in accordance with polarization of light at the first optical filter 33 and the second optical filter 35 according to the present modification is an example of a polarization selecting region.

Even in such configuration, the optical system 30 may have non-telecentricity for a light ray having a polarization direction parallel to the x-axis, and have telecentricity on the object side for a light ray having a polarization direction orthogonal to the x-axis. Furthermore, according to the technique of the present modification, the three-dimensional position with respect to the object point O on the subject and the three-dimensional shape of the surface of the subject can be calculated regardless of wavelength characteristics of the subject.

The technique according to the present modification can be combined with the technique according to the first modification. In other words, even in the case of using the difference in polarization direction, the amount of light passing through the non-telecentric optical system 50 can be increased.

The technique according to the present modification can be combined with the technique according to the first embodiment. For example, each of the wavelength selecting members of the first optical filter 33 and the second optical filter 35 may have a plurality of wavelength selecting filters and a plurality of polarization filters. In this case, the plurality of wavelength selecting filters and the plurality of polarization filters may be arranged in series with respect to a light ray passing therethough, or may be arranged in different regions in each optical filter. For example, a wavelength selecting filter and a polarization selecting filter may be configured to be replaceable with each other. For example, the optical filters may be configured to be switchable with each other. For example, the optical test apparatus 10 may be provided with an optical system using a wavelength selecting filter and an optical system using a polarization selecting filter, and the optical systems may be switched in accordance with a measurement target. With such configurations, information pertaining to the subject can be calculated if either one of a wavelength and a polarization direction is measurable. In other words, types of a measurable subject can be increased. The accuracy of calculation of information pertaining to the subject can be improved if both of a wavelength and a polarization direction are measurable.

The above embodiment and modifications describe, as an example, the case using one image sensor 60; however, the configuration is not limited thereto. According to the present technique, since the imaging axis IA is provided away from the optical axis OA, a plurality of imaging axes IA can be set around the optical axis OA. In other words, a plurality of image sensors 60 may be provided in the effective region EA. In this case, the plurality of image sensors 60 are examples of a first image sensor and a second image sensor. FIG. 13 is a schematic view of the x-y cross section for explaining an example of an arrangement of the imaging planes 61 in a case where the optical device 20 of FIG. 1 has a plurality of image sensors 60. As shown in FIG. 13, each of the plurality of imaging axes IA of the plurality of image sensors 60 is arranged at a position off of the optical axis OA. The plurality of imaging planes 61 of the plurality of image sensors 60 are provided in the effective region EA. In the example shown in FIG. 13, the plurality of imaging planes 61 are arranged in a circle. The number of the plurality of image sensors 60 may be two to seven, or a plural number equal to or more than nine. The plurality of image sensors 60 may include, for example, at least one color CCD and at least one polarization camera. In this case, it is only necessary that the type of an optical filter corresponds to the type of an image sensor in each pair, and the arrangement and number of the color CCDs and polarization cameras may be set discretionarily. The arrangement of the plurality of image sensors 60 is not limited to a circle, and the distances from the optical axis to the respective image sensors 60 may be different from each other.

The above embodiment and modifications describe, as an example, the case where each optical filter is divided into two regions. However, the configuration is not limited thereto. Each optical filter may be divided into three or more regions. The number into which the first optical filter 33 is divided may be different from the number into which the second optical filter 35 is divided.

In the configuration of FIG. 3, for example, the edge portion (periphery) of the second optical filter 35 may be further provided with a region that does not transmit a red wavelength component such as a region that transmits blue light rays and a region that does not transmit visible light rays. According to this configuration, it is possible to eliminate red light rays transmitted through the end portion of the lens 31 that has lower performance than on the optical axis, and light rays scattered at the end portions of the lens 31 and the second optical filter 35, etc. In other words, this configuration has the effect of reducing noise.

The above embodiment and modifications describe, as an example, a case where information pertaining to the subject including the object point O is calculated based on environment light scattered at the object point O. However, the configuration is not limited thereto. For example, the optical test apparatus 10 may further include a light source such as a light-emitting diode (LED), and a target for measurement such as a dot pattern and a checker pattern. In this case, a position and a shape relative to the target for measurement are calculated as information pertaining to the subject. The characteristics of each optical filter can be optimized if the measurement target is known, which leads to further improvement of the measurement accuracy.

The above embodiment and modifications describe, as an example, a case where information pertaining to the subject is calculated based on a difference in imaging position between a plurality of wavelengths and a difference in imaging position between a plurality of polarizations. However, the configuration is not limited thereto. For example, by measuring time-series variation of the imaging position, presence/absence of refractive-index distribution in the three-dimensional space (the −z side of the lens 31) may be calculated as information pertaining to the subject. The second optical filter 35 is not necessarily provided.

The above embodiment and modifications describe, as an example, a case where the telecentric optical system 40 and the non-telecentric optical system 50 have the same optical axis. However, the configuration is not limited thereto. It is only necessary to measure two light rays respectively passing through the telecentric optical system 40 and the non-telecentric optical system 50, among the light rays emitted from the object point O, on an imaging plane having an imaging axis different from an optical axis of the telecentric optical system 40 and an optical axis of the non-telecentric optical system 50. With this configuration, measurement can be performed not only between the optical system 30 and the image sensor 60, which leads to improvement of design flexibility. Furthermore, with this configuration, the subject on the optical axis can be imaged.

In the above embodiment and modifications, the telecentric optical system 40 and the non-telecentric optical system 50 may respectively have telecentricity on the image side. In this case, the configuration of FIG. 3, for example, further includes a lens arranged on the optical axis OA in a manner that the first optical filter 33 is located at the object-side focal point. Herein, for example, the effective region EA is a region obtained by excluding, from a region which is on the image side of the further-arranged lens and is equal to or less than a length obtained by multiplying the radius from the optical axis OA to the edge portion of the peripheral region A21 on the lens side by the magnification ratio of the optical system 30, a region less than a length obtained by multiplying the radius from the optical axis OA to the edge portion of the central region A22 on the lens side by the magnification ratio of the optical system 30.

In the above explanation, the image sensor 60 is assumed to be arranged in the effective region EA. However, the present embodiment and the modifications do not hinder the image sensor 60 from being arranged in a region other than the effective region EA. For example, the optical device 20 may include an image sensor 60 arranged in the effective region EA and an image sensor 60 arranged in a region other than the effective region EA. In this case, driving of the image sensor 60 arranged in a region other than the effective region EA is preferably stopped at the time of imaging. As a result, the distance can be measured similarly to a case where the image sensor 60 is arranged only in the effective region EA. Furthermore, the image sensor 60 arranged in the effective region EA and the image sensor 60 arranged in a region other than the effective region EA may be driven at the time of imaging. In this case, the processing circuitry 70 may measure the distance by using image data from the image sensor 60 arranged in the effective region EA, without using image data from the image sensor 60 arranged in a region other than the effective region EA.

In the above explanation, the wavelength selecting filter and the polarization selecting filter are described as examples of a characteristic selecting member provided in the optical filter. However, the configuration is not limited thereto. It is only necessary to determine whether the image position relative to the light received at the image sensor 60 is produced by the light passing through the telecentric optical system 40 or the non-telecentric optical system 50. In other words, the characteristic selecting member may be an intensity filter, a spatial frequency filter, etc. which selectively transmit light in accordance with the light intensity and the spatial frequency. As a characteristic selecting member, a liquid crystal filter of which light transmission amount varies upon application of a voltage may be used. In this case, relative to the first optical filter 33, for example, the central region A12 of the focal plane and the peripheral region A11 of the focal plane are controlled in synchronization with the imaging timing at the image sensor 60 so as to have different transmission rates.

The techniques according to the respective embodiments and the modifications can measure information concerning the subject (test object) with high accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical test apparatus comprising:
a light convergence element for converging light from a subject;
an optical filter arranged on an optical axis of the light convergence element; and
an image sensor that receives light passing through the light convergence element and the optical filter, wherein an entire body of the image sensor is arranged in an effective region not crossing the optical axis of the light convergence element, the optical filter includes:
- a first optical filter arranged on an image-side focal plane of the light convergence element; and
- a second optical filter arranged on an image-side principal point plane of the light convergence element, the light convergence element includes a pair of lenses symmetrical to each other with respect to a surface orthogonal to the optical axis, the second optical filter is arranged between the pair of lenses, and the imaging sensor receives a light ray having a first characteristic and a light ray having a second characteristic emitted from a same object point and passing through the first optical filter and the second optical filter.

2. The optical test apparatus of claim 1, wherein the optical filter includes a characteristic selecting region that selectively transmits light in accordance with a characteristic of light.

3. The optical test apparatus of claim 2, wherein the characteristic selecting region includes a wavelength selecting region that selectively transmits light in accordance with a wavelength and/or a polarization selecting region that selectively transmits light in accordance with polarization.

4. The optical test apparatus of claim 2, wherein
the characteristic selecting region of the first optical filter includes a first central region within less than a first distance from a focal point of the light convergence element, the first central region transmitting light having a first characteristic, and
the effective region is a region separate from the optical axis by equal to or more than the first distance.

5. The optical test apparatus of claim 2, wherein
the characteristic selecting region of the first optical filter includes:
- a first central region that is provided in a region within less than a first distance from a focal point of the light convergence element, and that transmits light having a first characteristic; and
- a first peripheral region that is provided in a region away from the focal point by equal to or more than the first distance, and that transmits light having a second characteristic different from the first characteristic, and the characteristic selecting region of the second optical filter includes:
- a second central region that is provided in a region within less than a second distance from a principal point of the light convergence element, and that transmits light having the first characteristic; and
- a second peripheral region that is provided in a region away from the principal point by equal to or more than the second distance, and that transmits light having the second characteristic.

6. The optical test apparatus of claim 5, wherein the second distance is longer than the first distance.

7. The optical test apparatus of claim 5, wherein the second distance is not constant around the optical axis.

8. The optical test apparatus of claim 5, wherein the effective region is a region that opens from the focal point in an optical axis direction different from the second optical filter, and that is included in a region surrounded by a first curved surface passing through the focal point and an edge of the second peripheral region and a second curved surface passing through an edge of the first central region and an edge of the second central region.

9. The optical test apparatus of claim 5, further comprising processing circuitry that calculates, based on output from the image sensor, a distance between an image produced by the light having the first characteristic and an image produced by the light having the second characteristic on an imaging plane of the image sensor, and calculates a three-dimensional position of a point on the subject based on the calculated distance on the imaging plane.

10. The optical test apparatus of claim 1, wherein the image sensor includes a first image sensor and a second image sensor arranged at different positions in the effective region.

* * * * *